US008804014B2

United States Patent
Kera

(10) Patent No.: US 8,804,014 B2
(45) Date of Patent: Aug. 12, 2014

(54) IMAGING DEVICE FOR REDUCING COLOR MOIRE

(75) Inventor: Hideaki Kera, Koshigaya (JP)

(73) Assignee: Nikon Corporation, Tokyo (JP)

( * ) Notice: Subject to any disclaimer, the term of this patent is extended or adjusted under 35 U.S.C. 154(b) by 40 days.

(21) Appl. No.: 12/689,653

(22) Filed: Jan. 19, 2010

(65) Prior Publication Data

US 2010/0194939 A1  Aug. 5, 2010

(30) Foreign Application Priority Data

Feb. 2, 2009  (JP) ................................. 2009-021571

(51) Int. Cl.
*H04N 9/083* (2006.01)
*H04N 3/14* (2006.01)
*H04N 5/335* (2011.01)
*H04N 9/04* (2006.01)

(52) U.S. Cl.
USPC ........... 348/273; 348/272; 348/277; 348/248; 348/280; 348/336

(58) Field of Classification Search
CPC ... H04N 9/045; H04N 5/3452; H04N 5/3456; H04N 5/347
USPC .................. 348/273, 272, 277, 248, 280, 336
See application file for complete search history.

(56) References Cited

U.S. PATENT DOCUMENTS

| | | | |
|---|---|---|---|
| 7,688,364 B2 * | 3/2010 | LeGall et al. ............ | 348/240.99 |
| 7,920,200 B2 * | 4/2011 | Azuma ........................ | 348/335 |
| 8,212,899 B2 * | 7/2012 | Egawa .......................... | 348/246 |
| 2001/0010554 A1 * | 8/2001 | Yoshida ........................ | 348/312 |
| 2003/0020819 A1 | 1/2003 | Fukuda | |
| 2006/0125937 A1 * | 6/2006 | LeGall et al. ............ | 348/240.99 |
| 2008/0106631 A1 | 5/2008 | Sugawara et al. | |
| 2010/0053356 A1 * | 3/2010 | Tsunekawa et al. ....... | 348/222.1 |

FOREIGN PATENT DOCUMENTS

JP  A-2003-46876  2/2003
JP  A-2008-141728  6/2008

OTHER PUBLICATIONS

Feb. 19, 2013 Japanese Office Action issued in Japanese Patent Application No. 2009-021571 (with translation).

* cited by examiner

*Primary Examiner* — Antoinette Spinks
(74) *Attorney, Agent, or Firm* — Oliff PLC

(57) ABSTRACT

An imaging device includes an imagine lens, an imaging sensor having a color filter array with color filters of a plurality of colors having a plurality of pixels which are arranged on a light-receiving surface, a computing section obtaining a pixel value of an objective pixel by adding pixel values of a plurality of adjacent pixels which are adjacent to the objective pixel and which have one of the color filters of same color as the objective pixel among pixel values output from the imaging sensor, and a control section making the computing section compute, while shifting the objective pixel one by one in one direction, a pixel row formed of pixel values of the objective pixel in the one direction with respect to each predetermined pixel width in other direction, and generating an image thinned out at the predetermined pixel width in the other direction.

6 Claims, 5 Drawing Sheets

Fig. 2

Horizontal Scanning Direction X

|   | X1 | X2 | X3 | X4 | X5 | X6 | X7 |
|---|---|---|---|---|---|---|---|
| Y1 | R11 | Gr12 | R13 | Gr14 | R15 | Gr16 | R17 |
| Y2 | Gb21 | B22 | Gb23 | B24 | Gb25 | B26 | Gb27 |
| Y3 | R31 | Gr32 | R33 | Gr34 | R35 | Gr36 | R37 |
| Y4 | Gb41 | B42 | Gb43 | B44 | Gb45 | B46 | Gb47 |
| Y5 | R51 | Gr52 | R53 | Gr54 | R55 | Gr56 | R57 |
| Y6 | Gb61 | B62 | Gb63 | B64 | Gb65 | B66 | Gb67 |
| Y7 | R71 | Gr72 | R73 | Gr74 | R75 | Gr76 | B77 |
| Y8 | Gb81 | B82 | Gb83 | B84 | Gb85 | B86 | Gb87 |
| Y9 | R91 | Gr92 | R93 | Gr94 | R95 | Gr96 | R97 |

Vertical Scanning Direction Y

Fig. 4

Horizontal Scanning Direction X →

| | X1 | X2 | X3 | X4 | X5 | X6 | X7 | |
|---|---|---|---|---|---|---|---|---|
| Y1 | R11 | Gr12 | R13 | Gr14 | R15 | Gr16 | R17 | |
| Y2 | Gb21 | B22 | Gb23 | B24 | Gb25 | B26 | Gb27 | |
| Y3 | R31 | Gr32 | R33 | Gr34 | R35 | Gr36 | R37 | |
| Y4 | Gb41 | B42 | Gb43 | B44 | Gb45 | B46 | Gb47 | |
| Y5 | R51 | Gr52 | R53 | Gr54 | R55 | Gr56 | R57 | |
| Y6 | Gb61 | B62 | Gb63 | B64 | Gb65 | B66 | Gb67 | |

Vertical Scanning Direction Y ↓

Fig. 5

Horizontal Scanning Direction X

| | X3 | X4 | X5 | X6 | X7 | X8 | X9 |
|---|---|---|---|---|---|---|---|
| Y3 | R33 | Gr34 | R35 | Gr36 | R37 | Gr38 | R39 |
| Y4 | Gb43 | B44 | Gb45 | B46 | Gb47 | B48 | Gb49 |
| Y9 | R93 | Gr94 | R95 | Gr96 | R97 | Gr98 | R99 |
| Y10 | Gb103 | B104 | Gb105 | B106 | Gb107 | B108 | Gb109 |
| Y15 | R151 | Gr152 | R153 | Gr154 | R155 | Gr156 | R157 |
| Y16 | Gb161 | B162 | Gb163 | B164 | Gb165 | B166 | Gb167 |

Vertical Scanning Direction Y

IMAGING DEVICE FOR REDUCING COLOR MOIRE

CROSS-REFERENCE TO RELATED APPLICATION

This application is based upon and claims the benefit of priority from Japanese Patent Application No. 2009-021571, filed on Feb. 2, 2009, the entire contents of which are incorporated herein by reference.

BACKGROUND

1. Field

The present application relates to an imaging device capable of reducing a color moire in a captured image.

2. Description of the Related Art

In recent years, in accordance with an improvement in performance of an imaging sensor such as a CCD and a CMOS, a digital camera, a digital video camera and the like capable of changing a gain setting of imaging sensitivity and capable of easily capturing an image with high sensitivity have been becoming popular. However, when capturing a still image of night scene in which a shutter speed becomes slow due to a lack of light amount, when capturing a moving image at a high frame rate and the like, addition processing and the like are performed on pixel values of an imaging sensor. A technical development has been under way for realizing an improvement in sensitivity and image quality by reducing a moire, a noise and the like generated at the time of processing (for example, Japanese Unexamined Patent Application Publication No. 2003-46876).

However, the method of addition processing for the pixel values of the imaging sensor such as the one in the prior art has a problem such that, since color filters of respective colors of R (red), Gr (Gb) (green), and B (blue) provided in respective pixels of the imaging sensor are arranged in a Bayer array being a non-uniform array, even if a high component of spatial frequency equal to or greater than a Nyquist frequency which causes an image deterioration is removed by an optical low-pass filter, a threshold value of the Nyquist frequency is lowered by the addition of the pixel values as described above, which results in generating an image deterioration due to a color moire among the moires.

SUMMARY

In view of the aforementioned problems in the prior art, a proposition of the present embodiments is to provide a technique capable of performing addition processing for pixel values of an imaging sensor in which a color moire is hardly generated.

To solve the aforementioned problems, an imaging device of the present embodiments includes an imaging lens, an imaging sensor having a color filter array in which color filters of a plurality of colors are disposed in a predetermined pattern and having a plurality of pixels which are two-dimensionally arranged on a light-receiving surface to correspond to the predetermined pattern, a computing section obtaining a pixel value of an objective pixel by adding pixel values of a plurality of adjacent pixels which are a plurality of pixels adjacent to the objective pixel and which have one of the color filters of same color as the objective pixel among pixel values output from the plurality of pixels of the imaging sensor, and a control section making the computing section compute, while shifting the objective pixel one by one in one direction, a pixel row formed of pixel values of the objective pixel in the one direction with respect to each predetermined pixel width in other direction, and generating an image thinned out at the predetermined pixel width in the other direction.

Further, the plurality of adjacent pixels may also be a plurality of pixels adjacent to the objective pixel and located on each of lines in the one direction and the other direction or in directions of 45 degrees and 135 degrees with respect to the one direction.

Further, the control section may make the computing section compute by using pixel values of a plurality of pixels adjacent to the objective pixel as the plurality of adjacent pixels which are located on each of lines in the one direction and the other direction or in directions of 45 degrees and 135 degrees with respect to the one direction in accordance with a position of the objective pixel.

Further, the computing section may add the pixel values of the plurality of adjacent pixels, compute an average value, and set the average value as the pixel value of the objective pixel.

Moreover, the imaging device of the present embodiments may further include a weighted average section performing weighted average on each pixel row formed of the pixel values of the objective pixel in the one direction of the image being thinned-out for each predetermined number of pixels.

According to the present embodiments, it is possible to perform addition processing on pixel values of an imaging sensor in which a color moire is hardly generated.

BRIEF DESCRIPTION OF THE DRAWINGS

FIG. 2 is a view showing a pixel array of a part of a still image captured by the digital camera 100.

FIG. 4 is a view showing an extraction of pixels on first six horizontal scanning lines out of the pixel array of the part of the still image in FIG. 2.

FIG. 5 is a view showing a pixel array after the addition processing and the weighted average processing are performed on the pixel array of the part of the still image in FIG. 2.

DETAILED DESCRIPTION OF THE EMBODIMENTS

<<One Embodiment>>

Figure 1:
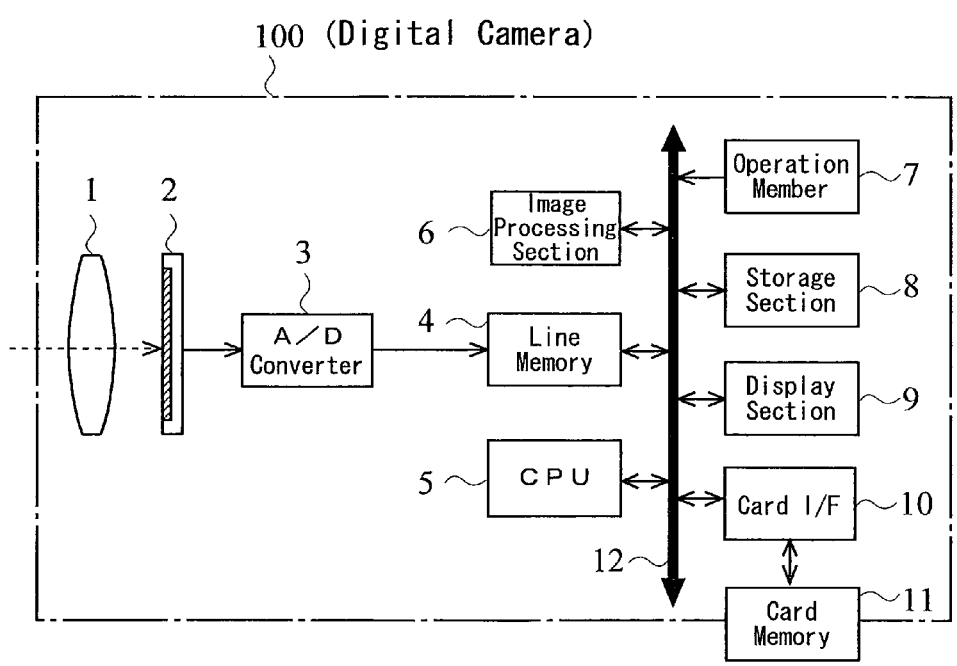
FIG. 1 is a schematic view showing a structural example of a digital camera 100 according to one embodiment of the present invention.

FIG. 1 is a structural view of a digital camera 100 according to one embodiment of the present invention.

The digital camera 100 is formed of an imaging lens 1, an imaging sensor 2, an A/D converter 3, a line memory 4, a CPU 5, an image processing section 6, an operation member 7, a storage section 8, a display section 9, and a card interface (card I/F) 10. The line memory 4, the CPU 5, the image processing section 6, the operation member 7, the storage section 8, the display section 9, and the card I/F 10 are coupled so as to be capable of transmitting information via a bus 12. Note that FIG. 1 shows only an essential part of the digital camera 100. For example, a timing generator that supplies a timing pulse of shooting instruction to the imaging sensor 2 and the A/D converter 3 in accordance with an instruction from the CPU 5, and the like are omitted in FIG. 1.

The imaging lens 1 is formed of a plurality of optical lenses, and forms a subject image on a light-receiving surface of the imaging sensor 2.

The imaging sensor 2 is a CCD or CMOS semiconductor image sensor or the like in which a plurality of pixels disposed on the light-receiving surface thereof respectively have color filters of either R, Gr (Gb), or B arranged in a Bayer array format. In accordance with the instruction from the CPU 5, the imaging sensor 2 can capture a subject image with all pixels, or capture a through image for live view and a subject image in a moving image by performing thinning in a horizontal scanning direction or a vertical scanning direction to read out pixel values. FIG. 2 shows a pixel array of a part of the image captured by the imaging sensor 2 with all pixels. Each cell indicates one pixel. First symbols R, Gr (Gb), and B in the respective cells indicate pixels having the respective color filters. Two-digit numbers following these symbols indicate positions of the pixels. Note that a part of the image in FIG. 2 corresponds to a part of an upper left corner starting with a pixel R11.

Upon receiving the instruction from the CPU 5, the imaging sensor 2 operates based on the timing pulse supplied from the timing generator (not shown), and captures a subject image formed by the imaging lens 1 provided in front thereof. Based on the instruction from the CPU 5, the captured image data is output as an image signal from the imaging sensor 2 and is converted into a digital signal in the A/D converter 3. The digital image signal is temporarily recorded in the line memory 4. Here, in the present embodiment, in order to perform addition processing on pixel values output from the imaging sensor 2 as will be described later, the imaging sensor 2 is supposed to receive, from the CPU 5 via the timing generator (not shown), an instruction to output pixel values on a plurality of horizontal scanning lines at a time. Further, the number of the plurality of horizontal scanning lines is set to six, in the present embodiment. Therefore, the line memory 4 in FIG. 1 is supposed to be formed of six line memories each recording pixel values on each of six horizontal scanning lines. Further, a high speed SRAM or the like can be appropriately selected and used as the line memory 4.

The CPU 5 reads a control program stored in the storage section 8, receives various instructions from users via the operation member 7, and controls to operate the digital camera 100 based on the instructions. For example, the CPU 5 performs control to give an instruction for capturing a subject image to the imaging sensor 2, to make the image processing section 6 perform image processing on the captured image data, to record the processed image in the storage section 8 and the card memory 11, to display the image on the display section 9, and the like. Further, as described above, in the present embodiment, the CPU 5 gives a control instruction for performing addition processing to improve sensitivity and image quality of the captured image, to the imaging sensor 2, the line memory 4, and the image processing section 6. A commonly used computer's CPU can be used as the CPU 5.

The image processing section 6 is a digital front end circuit that performs image processing such as interpolation processing, edge enhancement processing, and white balance correction on the captured still image, moving image or through image to generate a still image file in JPEG format, YUV format or the like, and a moving image file in MPEG format or the like, and performs addition processing and weighted average processing on the still image based on a setting made by a user, to thereby improve the sensitivity and the image quality.

The operation member 7 outputs, to the CPU 5, an operation signal in accordance with the contents of operation of the member made by the user. The operation member 7 includes an operation member such as, for instance, a power button, a mode setting button for setting a shooting mode and the like, and a release button. Note that the operation member 7 may also be a touch panel type button displayed on a screen of later-described display section 9.

The storage section 8 stores image data captured by the digital camera 100, the control program with which the CPU 5 controls the digital camera 100, and the like. The program and the data stored in the storage section 8 can be appropriately referred to from the CPU 5 via the bus 12. A commonly used hard disk device, a magneto-optic disk device, an arbitrary nonvolatile memory being a semiconductor memory, or the like can be appropriately selected and used as the storage section 8.

The display section 9 displays a through image, a shot image, a mode setting screen or the like. A liquid crystal monitor or the like can be appropriately selected and used as the display section 9.

The card memory 11 is detachably attached to the card I/F 10. The captured still image or moving image is image-processed in the image processing section 6 based on the instruction from the CPU 5, and is recorded in the card memory 11 as a file in JPEG format, MPEG format or the like.

Next, a procedure of addition processing and weighted average processing in the digital camera 100 according to the present embodiment will be described with reference to a flow chart shown in FIG. 3.

When the power button of the operation member 7 is pressed by a user, the CPU 5 reads the control program stored in the storage section 8 of the digital camera 100, and initializes the digital camera 100. Subsequently, processing from step S10 is carried out. Note that in the present embodiment, it is assumed that the mode is previously set, by the user with the mode setting button of the operation member 7, to the mode for performing the addition processing and the weighted average processing to improve the sensitivity and the image quality of the captured still image.

Step S10: The CPU 5 determines whether or not the release button of the operation member 7 is pressed by the user and a signal for instructing to capture a subject image is received. When the CPU 5 receives the signal for instructing to capture the subject image made by the user, it makes the imaging sensor 2 capture a still image with all pixels via the timing generator (not shown), and proceeds to step S11 (YES side). Meanwhile, when the CPU 5 does not receive the signal of capturing instruction (NO side), it waits at step S10 until it receives the capturing instruction, makes the imaging sensor 2 capture the subject image through thinning-out reading at a predetermined frame rate (30 fps, for instance) via the timing generator (not shown), makes the image processing section 6 perform image processing such as interpolation processing, edge enhancement processing, and white balance correction, and displays the image on the display section 9 as a through image generated for live view.

Step S11: The CPU 5 issues an instruction, to the imaging sensor 2 via the timing generator (not shown), to sequentially output pixel values located on first six horizontal scanning lines Y1 to Y6. The imaging sensor 2 outputs the pixel values on the respective horizontal scanning lines, and the pixel values on the respective horizontal scanning lines are converted from analog to digital signals by the A/D converter 3 to be temporarily recorded in the line memory 4.

Step S12: The CPU 5 transfers data on the pixel values on the horizontal scanning lines Y1 to Y6 recorded in the line memory 4 in step S11 (FIG. 4) to the image processing section 6 via the bus 12. FIG. 4 shows the data on the pixel values on the horizontal scanning lines Y1 to Y6 read out in step S11. The image processing section 6 performs image processing such as interpolation processing, edge enhancement processing, and white balance correction on the transferred data on the pixel values on the horizontal scanning lines Y1 to Y6.

Step S13: The image processing section 6 performs addition processing on the pixel values on the horizontal scanning lines Y1 to Y6 image-processed in step S12. Concretely, for instance, when the pixel of R33 located on the horizontal scanning line Y3 is set as an objective pixel, the image processing section 6 adds, except the pixel value of R33, pixel values of R13, R31, R35 and R53 being pixels located on the horizontal scanning lines Y1, Y3 and Y5, adjacent to R33 and having the color filters R of the same color, and sets the added pixel value as a new pixel value of R33. In like manner, the image processing section 6 sequentially performs addition processing as represented by the following equation (1) on all pixel values of pixels such as Gr34 adjacent to R33, located on the horizontal scanning line Y3 and the horizontal scanning line Y4.

$$R'(i,j)=R(i-2,j)+R(i+2,j)+R(i,j-2)+R(i,j+2) \quad (1)$$

$$Gr'(i+1,j)=Gr(i-1,j)+Gr(i+3,j)+Gr(i+1,j-2)+Gr(i+1,j+2)$$

$$Gb'(i,j+1)=Gb(i-2,j+1)+Gb(i+2,j+1)+Gb(i,j-1)+Gb(i,j+3)$$

$$B'(i+1,j+1)=B(i-1,j+1)+B(i+3,j+1)+B(i+1,j-1)+B(i+1,j+3)$$

Here, coordinates of the objective pixel of R are set to (i,j) (i=3, 4, 5, . . . , M−3, j=3, 4, 9, 10, . . . , N−3, N−2 (M and N are integers of six or more)). Further, each of R', Gr', Gb' and B' indicates the added pixel value.

As described above, in the present embodiment, the pixel value of the objective pixel itself is obtained by adding, except its own pixel value, the pixel values adjacent to the pixel value at the top, bottom, left and right and having the color filters of the same color, and the original pixel value of the objective pixel itself is used to obtain an added pixel value of another objective pixel adjacent to the pixel and having the color filter of the same color. Accordingly, it is possible to reduce the color moire, which enables to improve the sensitivity and the image quality of the still image.

Step S14: The CPU 5 determines whether the pixel values on all the horizontal scanning lines of the still image captured by the imaging sensor 2 with all pixels are read or not. When the CPU 5 reads the pixel values on all the horizontal scanning lines, it proceeds to step S15 (YES side). Meanwhile, when the CPU 5 has not read the pixel values on all the horizontal scanning lines yet, it proceeds to step S11 (NO side), and reads pixel values on the following Y7 and subsequent lines, for each of six horizontal scanning lines. Further, the CPU 5 performs processing of step S11 to step S13. FIG. 5 shows an image after the addition processing is finally performed on the pixel values on all the horizontal scanning lines shown in FIG. 2. Though this processing, the number of horizontal scanning lines is reduced to one-third and the pixel values corresponding to two-pixel width surrounding the original still image (for instance, R11, Gr12, and the like) are eliminated, as shown in FIG. 5.

Step S15: The image processing section 6 performs, since the number of horizontal scanning lines in the still image captured by the imaging sensor 2 is reduced to one-third through the addition processing from step S11 to step S14 as shown in FIG. 5, a publicly known general method of weighted average on each of three pixels having the color filters of the same color (for instance, R33, R35 and R37, and the like) on the respective horizontal scanning lines in order to set a ratio of vertical to horizontal length of the still image to be the same as that of the original still image, and generates a new still image having the same ratio of vertical to horizontal length as that of the original still image.

Step S16: The image processing section 6 records the still image on which the processing in step S15 is performed, as a file in jPEG format, YUV format or the like in the storage section 8 and the card memory 11 via the bus 12 and the card I/F 10, and completes a series of operations.

As described above, in the present embodiment, the pixel value of the objective pixel itself is obtained by adding, except its own pixel value, the pixel values adjacent to the pixel value at the top, bottom, left and right and having the color filters of the same color, and the original pixel value of the objective pixel itself is used to obtain a pixel value of another objective pixel adjacent to the pixel and having the color filter of the same color. Accordingly, it is possible to effectively reduce the color moire, which enables to improve the sensitivity and the image quality of the captured still image.

Further, the addition processing through the equation (1) in the present embodiment can reduce not only the color moire but also a luminance moire.

<<Another Embodiment>>

A digital camera according to another embodiment of the present invention is the same as the digital camera 100 according to the one embodiment. Therefore, the same digital camera 100 as that in the one embodiment shown in FIG. 1 is used as a digital camera in the present embodiment, and a detailed explanation on the respective components will be omitted.

Figure 3:
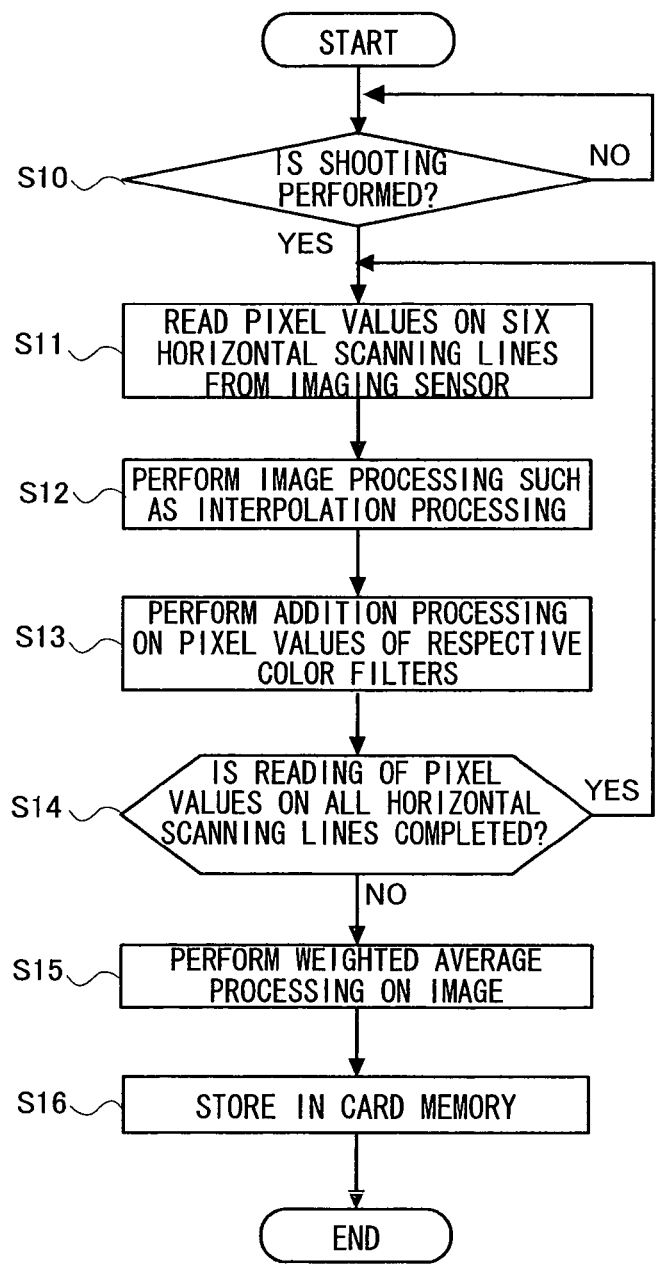
FIG. 3 is a flow chart showing a procedure of addition processing and weighted average processing in the digital camera 100 according to the one embodiment of the present invention.

Further, the procedure of the addition processing and the weighted average processing in the digital camera 100 according to the present embodiment is also basically the same as that from step S10 to step S16 in the flow chart shown in FIG. 3. However, the digital camera 100 in the present embodiment differs from the digital camera 100 in the one embodiment in how to perform the addition processing in step S13.

Concretely, in step S13 in the present embodiment, the image processing section 6 first performs the addition processing on the data on the pixel values on the horizontal scanning lines Y1 to Y6 shown in FIG. 4, in the same manner as in the one embodiment. At this time, if each pixel of R33, Gr34, Gb43 and B44 located on the horizontal scanning line Y3 and the horizontal scanning line Y4 (hereinafter, one combination of R, Gr, Gb and B is set as a Bayer block) is set as an objective pixel, for instance, the CPU 5 obtains an added pixel value of each pixel by using the equation (1), similar to the one embodiment.

Next, if each pixel in a Bayer block of R35, Gr36, Gb45 and B46 located on the horizontal scanning line Y3 and the horizontal scanning line Y4 and adjacent to the Bayer block of R33, Gr34, Gb43 and B44 is set as an objective pixel, there is performed addition processing as represented by the following equation (2) by using pixel values located on straight lines with angle of diagonally 45 degrees and 135 degrees with respect to the horizontal scanning lines, adjacent to the respective objective pixels and having the color filters of the same color.

$$R'(i,j)=R(i-2,j-2)+R(i+2,j-2)+R(i-2,j+2)+R(i+2,j+2) \quad (2)$$

$$Gr'(i+1,j)=Gr(i-1,j-2)+Gr(i+3,j-2)+Gr(i-1,j+2)+Gr(i+3,j+2)$$

$$Gb'(i,j+1)=Gb(i-2,j-1)+Gb(i+2,j-1)+Gb(i-2,j+3)+Gb(i+2,j+3)$$

$$B'(i+1,j+1)=B(i-1,j-1)+B(i+3,j-1)+B(i-1,j+3)+B(i+3,j+3)$$

Note that coordinates of the objective pixel are set to (i, j).

Specifically, in the present embodiment, the addition processing through the equation (1) and the addition processing through the equation (2) are alternately performed, in a manner such that the addition processing represented by the equation (1) is performed on a certain Bayer block, and the addition processing represented by the equation (2) is performed on the following Bayer block adjacent to the certain Bayer block. Further, in the present embodiment, the addition processing through the equation (1) and the equation (2) are performed on the following horizontal scanning line Y9 and the horizontal scanning line Y10 in the opposite order to that of the processing on the horizontal scanning line Y3 and the horizontal scanning line Y4, namely, the processing are alternately performed in a manner such that the addition processing through the equation (1) is performed after performing the addition processing through the equation (2).

As above, in the present embodiment, the addition processing through the equation (1) or the equation (2) is alternately performed to obtain added pixel values in each Bayer block on the horizontal scanning lines. Accordingly, even when an objective pixel has the color filter of the same color as that of the adjacent pixel, pixel values of different combination of adjacent pixels are used, so that the color moire can be more effectively reduced, and it becomes possible to improve the sensitivity and the image quality of the captured still image.

Further, the addition processing in the present embodiment in which the equation (1) and the equation (2) are combined enables to more effectively reduce not only the color moire but also the luminance moire.

<<Supplementary Items to the Embodiments>>

In the one embodiment and the other embodiment, although the pixel values are output for each of six horizontal scanning lines out of all the pixel values of the imaging sensor 2 in step S11, the present invention is not limited to this. For example, it is also possible that the pixel values are output for each of, not six, but a plurality of number of horizontal scanning lines. Note that in this case, there is a need to adjust the number of line memories 4 in accordance with the number of horizontal scanning lines from which the pixel values are output.

Note that in the one embodiment and the other embodiment, the line memory 4 and the image processing section 6 in the digital camera 100 are formed as independent components, but, the present invention is not limited to this, and it is also possible to form a digital front end circuit in which the line memory 4 and the image processing section 6 are formed as one component, and step S11 to step S15 are performed through pipeline processing. This enables to realize higher-speed image processing and downsizing of the circuit scale.

Further, for instance, when the digital camera 100 captures an image by being rotated, from its normal position (a state where an optical axis of the imaging lens 1 is set horizontally and a lower surface of the digital camera 100 is positioned downward, which is, so-called horizontal shooting), by 90 degrees or 270 degrees around the optical axis of the imaging lens 1 (so-called vertical shooting) and the like, it is also possible to read pixel values for each of a plurality of vertical scanning lines and perform the addition processing and the weighted average processing from step S11 to step S15. However, the equation (1) and the equation (2) are deformed as the following equation (3) and the following equation (4).

$$R'(i,j)=R(i,j-2)+R(i,j+2)+R(i-2,j)+R(i+2,j) \quad (3)$$

$$Gr'(i+1,j)=Gr(i-1,j-2)+Gr(i+1,j-2)+Gr(i-1,j)+Gr(i+3,j)$$

$$Gb'(i,j+1)=Gb(i,j-1)+Gb(i,j+3)+Gb(i-2,j+1)+Gb(i+2,j+1)$$

$$B'(i+1,j+1)=B(i+1,j-1)+B(i+1,j+3)+B(i-1,j+1)+B(i+3,j+1)$$

$$R'(i,j)=R(i-2,j-2)+R(i-2,j+2)+R(i+2,j-2)+R(i+2,j+2) \quad (4)$$

$$Gr'(i+1,j)=Gr(i-1,j-2)+Gr(i-1,j+2)+Gr(i+3,j-2)+Gr(i+3,j+2)$$

$$Gb'(i,j+1)=Gb(i-2,j-1)+Gb(i-2,j+3)+Gb(i+2,j-1)+Gb(i+2,j+3)$$

$$B'(i+1,j+1)=B(i-1,j-1)+B(i-1,j+3)+B(i+3,j-2)+B(i+3,j+3)$$

Here, coordinates of the objective pixel are set to (i, j), in which i is 3, 4, 9, 10, ..., M−3, M−2, and j is 3, 4, 5, 6, ..., N−3 (M and N are integers of six or more).

Note that in the one embodiment and the other embodiment, the pixel value of the objective pixel is obtained through the addition processing using the equation (1) and the equation (2) in step S13, but, the present invention is not limited to this. For instance, it is also possible to average the added pixel value of the objective pixel, and to set the average value as the pixel value of the objective pixel. By using the average value as the pixel value of the objective pixel as above, it is possible to achieve an effect of improving an S/N ratio of the still image processed in the weighted average processing in step S15 in which the size of the image is changed.

Note that in the one embodiment and the other embodiment, the weighted average processing is performed in step S15 to set the ratio of vertical to horizontal length of the image on which the addition processing is performed to be the same as that of the captured original still image, but, the present invention is not limited to this. For example, it is also possible that the weighted average processing by the image processing section 6 is not performed, and the image processing section 6 directly records raw data of the image on which only the addition processing is performed in the storage section 8 and the card memory 11. Further, according to need, the CPU 5 may make the image processing section 6 read the raw data and perform the weighted average processing, to thereby generate a still image having the same ratio of vertical to horizontal length as that of the original still image.

Note that in the one embodiment, although the color moire of the captured still image is reduced by the addition processing through the equation (1), the present invention is not limited to this, and it is also possible to reduce the color moire using the addition processing through the equation (2), for instance.

Note that in the other embodiment, although the color moire of the captured still image is reduced by changing the order of addition processing through the equation (1) and the equation (2) depending on the horizontal scanning lines, the present invention is not limited to this, and it is also possible to reduce the color moire using the addition processing through the equation (1) and the equation (2) which are performed on all the horizontal scanning lines in the same order.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An imaging device, comprising:
    an imaging sensor having a plurality of filters with different spectral characteristics are disposed in a predetermined pattern and having a plurality of pixels which are two-dimensionally arranged on a light-receiving surface to correspond to the predetermined pattern;
    a computing section obtaining a pixel value of an objective pixel by using pixel values output from a plurality of neighboring pixels arranged around the objective pixel selected from the plurality of pixels and disposed with a filter having a same spectral characteristics as the objective pixel; and
    a control section sequentially selecting the objective pixel from the pixels which output the pixel values from the imaging sensor and making the computing section obtain a pixel value of each objective pixel being selected, wherein
    the computing section does not use the pixel value output from the objective pixel when obtaining the pixel value of the objective pixel itself which is selected by the control section, and uses the pixel value output from the objective pixel when the objective pixel is one of the neighboring pixels and one other pixel is selected as the objective pixel by the control section.

2. The imaging device according to claim 1, wherein
    the imaging sensor is arranged with in order of a first pixel, a second pixel, a third pixel, a fourth pixel, and a fifth pixel along a first direction, in which the first pixel receives light made incident through a filter having a first spectral characteristic, the second pixel receives light made incident through a filter having a second spectral characteristic which is different from the first spectral characteristic, the third pixel receives light made incident through a filter having the first spectral characteristic, the fourth pixel receives light made incident through a filter having the second spectral characteristic, and the fifth pixel receives light made incident through a filter having the first spectral characteristic: and
    the computing section does not use a pixel value output from the third pixel when the third pixel is selected as the objective pixel by the control section, and obtains the pixel value of the third pixel by using pixel values output from the first pixel and the fifth pixel, the first pixel and the fifth pixel being the neighboring pixels.

3. The imaging device according to claim 2, wherein
    the computing section obtains one of the pixel value of the first pixel and the pixel value of the fifth pixel by using the pixel value output from the third pixel when one of the first pixel and the fifth pixel is selected as the objective pixel by the control section, the third pixel being one of the neighboring pixels.

4. The imaging device according to claim 2, wherein
    the imaging sensor is arranged with in order of a sixth pixel, a seventh pixel, the third pixel, an eighth pixel, a ninth pixel along a second direction perpendicular to the first direction, in which the sixth pixel receives light made incident through a filter having the first spectral characteristic, the seventh pixel receives light made incident through a filter having the second spectral characteristic, the third pixel, the eighth pixel receives light made incident through a filter having the second spectral characteristic, and the ninth pixel receives light made incident through a filter having the first spectral characteristic: and
    the computing section does not use the pixel value output from the third pixel when the third pixel is selected as the objective pixel by the control section, and obtains the pixel value of the third pixel by using pixel values output from the sixth pixel and the ninth pixel, the sixth pixel and the ninth pixel being the neighboring pixels.

5. The imaging device according to claim 4,
    the computing section obtains one of the pixel value of the sixth pixel and the pixel value of the ninth pixel by using the pixel value output from the third pixel when one of the sixth pixel and the ninth pixel is selected as the objective pixel by the control section, the third pixel being one of the neighboring pixels.

6. The imaging device according to claim 1, wherein
    the computing section obtains the pixel value of the objective pixel by calculating an average value from an additional value based on the neighboring pixels, the additional value being a sum of the pixel values output from the neighboring pixels.

* * * * *